United States Patent Office 3,317,598
Patented May 2, 1967

3,317,598
ARYL (1,1-DIHYDROPERFLUOROOCTYL) UREAS
Theodore Mill, Palo Alto, and John O. Rodin and Robert M. Silverstein, Menlo Park, Calif., and Cyril Woolf, Morristown, N.J., assignors to Allied Chemical Corporation, New York, N.Y., a corporation of New York
No Drawing. Filed Mar. 24, 1964, Ser. No. 354,450
6 Claims. (Cl. 260—553)

This invention relates to a new class of substituted ureas. More particularly, it relates to a new class of fluorine containing N,N'-tetra-substituted ureas having a unique combination of properties desirable for certain specific uses.

N,N'-tetra-substituted ureas which contain lower alkyl and aryl substituents such as tetramethyl urea and tetraphenyl urea are known. Such tetra-substituted ureas, however, have relatively high melting points, they lack thermal and oxidative stability, and their use is severely limited where it is necessary that compounds have a wide liquid range (i.e., a wide range between melting points and boiling points) for example, as high temperature lubricants. As is known, high temperature lubricants must remain liquid at relatively high temperatures of use and must also remain liquid at substantially lower temperatures to which the compounds may be subjected. The instant N,N'-tetra-substituted ureas have been found to be particularly useful for this purpose in that they have the requisite wide liquid ranges, and furthermore, they possess unique thermal and oxidative stability.

An object of the instant invention is to provide novel N,N'-tetra-substituted ureas. Another object is to provide a process for the preparation of N,N'-tetra-substituted ureas. A further object is to provide novel N,N'-tetra-substituted ureas for use as high temperature lubricants. Other objects and advantages will be apparent from the following detailed description.

The N,N'-tetra-substituted ureas of the present invention have the formula:

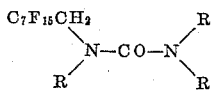

wherein R is a member selected from the group consisting of aryl and 1,1-dihydroperfluorooctyl, at least one R being an aryl. As employed herein, including the claims, the term aryl denotes mononuclear and condensed dinuclear aryl hydrocarbon radicals having 6 to 10 carbon atoms. Representative of the novel compounds are:

(1) Tris-(1,1-dihydroperfluorooctyl)-phenyl urea
(2) Bis-(1,1-dihydroperfluorooctyl)-1-naphthylphenyl urea
(3) Bis-(1,1-dihydroperfluorooctyl)-bis-(2-naphthyl) urea
(4) N-(1,1-dihydroperfluorooctyl)-N-(1-naphthyl) diphenyl urea
(5) Tris-(1,1-dihydroperfluorooctyl)-1-naphthyl urea
(6) Tris-(1,1-dihydroperfluorooctyl)-tolyl urea
(7) Tris-(1,1-dihydroperfluorooctyl)-xylyl urea
(8) Tris-(1,1-dihydroperfluorooctyl)-2,3-xylyl urea
(9) Tris-(1,1-dihydroperfluorooctyl)-2,4-xylyl urea
(10) Tris-(1,1-dihydroperfluorooctyl)-2,5-xylyl urea
(11) Tris-(1,1-dihydroperfluorooctyl)-2,6-xylyl urea
(12) Tris-(1,1-dihydroperfluorooctyl)-3,4-xylyl urea
(13) Tris-(1,1-dihydroperfluorooctyl)-3,5-xylyl urea The N,N'-tetra-substituted ureas of the present invention may be prepared by reaction of a secondary carbamyl chloride of the formula

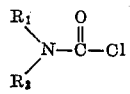

with a secondary amine of the formula

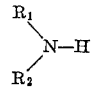

wherein $R_1$ and $R_2$ are members selected from the group consisting of aryl and 1,1-dihydroperfluorooctyl at least one $R_1$ being 1-1-dihydroperfluorooctyl and at least one $R_2$ being aryl.

The reaction which takes place may be illustrated by the following equation:

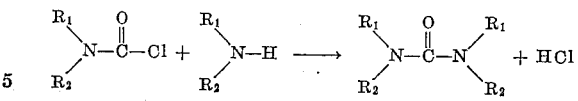

wherein $R_1$ and $R_2$ are aryl or 1,1-dihydroperfluorooctyl at least one $R_1$ being 1,1-dihydroperfluorooctyl and at least one $R_2$ being aryl.

The fluorine substituents in the compounds of the present invention may be supplied by either of the reactants or both, depending on the desired ultimate compound to be produced. Where one of the reactants contains two 1,1-dihydroperfluorooctyl substituents, however, the other reactant must contain at least one aryl substituent.

The secondary amines which are suitable for use in the process of the present invention include:

1,1-dihydroperfluorooctyl aniline
Bis-(1,1-dihydroperfluorooctyl) amine
1,1-dihydroperfluorooctyl-1-naphthylamine
1,1-dihydroperfluorooctyl-ortho-toluidine
1,1-dihydroperfluorooctyl-para-toluidine These secondary amines may be prepared by a wide variety of procedures. Merely as illustrative, the secondary amine, 1,1-dihydroperfluorooctyl aniline may be prepared by the conversion of perfluorooctanoanilide utilizing a reducing agent such as lithium aluminum hydride, or alternatively the reduction may be effected by catalytic pressure hyrogenation over a catalyst, for example, a copper chromite catalyst. The product, 1,1-dihydroperfluorooctyl aniline, appears in the reaction medium as a white crystalline solid, melting point 42 to 43° C. and may be recovered by any of the procedures known in the art for recovery of a solid, i.e., by filtration or centrifuge.

The secondary carbamyl chloride reactants which are suitable for use in the process of the present invention include:

Diphenylcarbamyl chloride, bis(1,1-dihydroperfluorooctyl) carbamyl chloride, phenyl-l-naphthyl carbamyl chloride, and phenyl-1,1-dihydroperfluoro carbamyl chloride.

In general, the secondary carbamyl chloride reactants may be prepared by reacting the secondary amine with phosgene.

The secondary carbamyl chloride reactant, bis(1,1-dihydroperfluorooctyl) carbamyl chloride may be prepared by a series of sequential steps as hereinafter described.

First, commercially available perfluorooctanoic acid is converted to the acid chloride by treatment with benzotrichloride or thionyl chloride. Generaly, the treatment involves refluxing the admixture until cessation of hydrogen chloride evolution which is an indication that the reaction is complete. The mixture is then distilled and the product, perfluorooctanoyl chloride, a water white liquid, boiling at about 133° C., is collected.

The perfluorooctanoyl chloride is thereafter introduced into a suitable apparatus equipped with agitating means, gas inlet and outlet tubes, and a water condenser, and dry ammonia, either in liquid or gaseous form is introduced into the reaction zone until ammonia no longer is absorbed which is usually in about 1½ to 3 hours. Ammonium chloride is precipitated as a by-product and may be separated from the reaction mixture by conventional means such as by filtration or centrifuge. The remaining solution containing perfluorooctanoylamide is then washed with a solvent to remove impurities.

The reactions described above may be illustrated by the following equations:

(1) $C_7F_{15}COOH + C_6H_5CCl_3 \rightarrow$
$$C_7F_{15}COCl + C_6H_5COCl + HCl$$

(2) $C_7F_{15}COCl + 2NH_3 \rightarrow C_7F_{15}CONH_2 + NH_4Cl$

The perfluorooctanoylamide produced according to Equation 2 above is thereafter converted to 1,1-dihydroperfluorooctylamine by employment of a reducing agent, examples of which include lithium aluminum hydride, sodium borohydride in the presence of $AlCl_3$ or $BF_3$-etherate, or alternatively the reduction is effected by catalytic pressure hydrogenation over a catalyst, for example, a copper chromite catalyst. The primary amine can also be produced from the amide $C_7F_{15}CONH_2$ by treatment with $P_2O_5$ or $POCl_3$ to form the nitrile, which is then reduced by lithium aluminum hydride or by $H_2$ in presence of noble metal catalyst. In a representative technique the reducing agent is added to a reaction vessel containing an inert solvent and an inert gas is passed throughout the system both before addition of the reducing agent and during the reaction period. Thereafter, a solution of perfluorooctanoylamide as prepared from Equation 2 is added to the mixture and the mixture refluxed, to produce 1,1-dihydroperfluorooctylamine in the reaction medium. The 1,1-dihydroperfluorooctylamine, a water white liquid with a boiling point of about 150–152° C., may be covered from the reaction medium by conventional means such as by distillation.

The above reaction may be illustrated by the following equation:

(3) $C_7F_{15}CONH_2 + 2H_2 \rightarrow C_7F_{15}CH_2NH_2H_2O$

The 1,1-dihydroperfluorooctylamine produced according to the above procedure is thereafter reacted with perfluorooctanoyl chloride to form N-1,1-dihydroperfluorooctyl perfluorooctanoamide. Conventional apparatus which includes agitating and cooling means may be employed according to the procedure. The reaction is slightly exothermic and is preferably conducted over an extended period of time generally about 0.5 to 8 hours accompanied by sufficient cooling to maintain the temperature within the range of about 10° C. to 70° C. preferably 30 to 40° C. The product, N-1,1-dihydroperfluorooctyl perfluorooctanoamide, a pink colored solid, may be recovered from the reaction medium by filtration or centrifuge. The N-1,1-dihydroperfluorooctyl perfluorooctanoamide is thereafter reduced to the secondary amine, bis-1,1-dihydroperfluorooctylamine by the use of a suitable reducing agent according to a procedure similar to that employed for the conversion of perfluorooctanoylamide to 1,1-dihydroperfluorooctylamine. The above reactions may be illustrated by the following equations.

(4) $C_7F_{15}COCl + H_2NCH_2C_7F_{15} \rightarrow$
$$C_7F_{15}CONHCH_2C_7F_{15} + HCl$$

(5) $C_7F_{15}CONHCH_2C_7F_{15} + 2H_2 \rightarrow$
$$(C_7F_{15}CH_2)_2NH + H_2O$$

Finally, the bis - (1,1 - dihydroperfluorooctyl)carbamyl chloride is prepared by reacting the secondary amine from above with phosgene, in a bomb at elevated temperatures, that is, temperatures of about 120–150° C. The product, bis(1,1-dihydroperfluorooctyl)carbamyl chloride, is a liquid, almost water white, and has a boiling point of about 138–141° C./12–13 mm. of Hg.

A preferred group of compounds of the present invention are those containing two or three 1,1-dihydroperfluorooctyl substituents and two or one respectively aryl substituents. Examples of these preferred compounds include tris(1,1-dihydroperfluorooctyl)-phenyl urea, bis-(1,1-dihydroperfluorooctyl)-1-naphthylphenylurea, bis-(1,1 - dihydroperfluorooctyl) - bis - (2 - naphthyl)urea, tris(1,1 - dihydroperfluorooctyl) - 1 - naphthylurea. These preferred compounds are the most stable, and have the most desirable physical properties such as a wide liquid range and effective lubricity particularly the compound tris(1,1-dihydroperfluorooctyl)phenyl urea.

The molar ratio of the secondary amine to the secondary carbamyl chloride utilized in preparing the compounds of the invention may be varied from about 0.4:1 to 4.0:1 respectively. Advantageously, a range of about 1:1 to 2:1 respectively is employed.

The reaction proceeds over the range of from about 200° C. to 375° C. Advantageously, a range of about 250° C. to about 350° C. is employed. In general, the rate of reaction is increased with increasing temperatures. However, excessive subjection of the reaction mass to the temperatures above the upper limit of the range may cause carbonization and the formation of undesired tars.

The reaction may be conveniently conducted under atmospheric pressure although super-atmospheric pressure or sub-atmospheric pressure may, if desired, be employed.

The desired compound is generally separated from the reaction mixture by first washing the mixture with a solvent such as ether to remove the impurities and thereafter recovering the product by a distillation procedure.

The following examples illustrate preparation of some of the starting materials of the invention as well as preparation of the novel compounds of the present invention:

*Example 1.—Preparation of perfluorooctanoanilide*

210 g. (0.49 mole) of perfluorooctanoyl chloride, dissolved in 270 ml. of dry ether, were placed in a 2 l., 3-neck flask, which was equipped with a stirrer, adding funnel, and a water condenser with an attached drying tube. A solution of 90 ml. of aniline (re-distilled) in 900 ml. of dry ether were added at the rate of 10 ml. per minute with gentle refluxing. A white precipitate gradually formed as the aniline solution was added. Stirring was continued for an additional half-hour period after all the aniline solution had been added. The heat was removed and 720 ml. of a 12.5% hydrochloric acid solution were added rapidly. The white precipitate gradually dissolved. After fifteen minutes of additional stirring, the mixture was transferred to a separatory funnel and the upper ether layer was separated. This layer was washed successively with 400 ml. of a 12.5% hydrochloric acid solution followed by 500 ml. of water. The ether solution was then dried overnight with anhydrous sodium sulfate. After filtering off the magnesium sulfate, the solvent was evaporated off on a steam bath. A white solid was obtained. The last traces of solvent were removed with a vacuum pump. There was obtained 231.4 g. of product. M.P.=112–113°. The conversion of perfluorooctanoyl chloride to perfluorooctanoanilide was 97.5% calculated as follows:

Percent conversion=

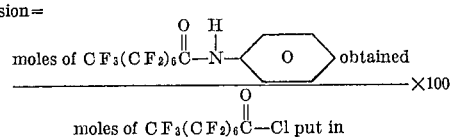

*Example 2.—Preparation of 1,1-dihydroperfluorooctyl aniline*

23 g. (0.61 mole) of lithium aluminum hydride were added to 500 ml. of dry tetrahydrofuran in a 3-liter, 3-neck flask, equipped with an adding funnel, magnetic stirring bar, and a water condenser. The flask was continually purged with nitrogen. A solution of 170.5 g. (0.35 mole) of perfluorooctanoanilide in 500 ml. of dry tetrahydrofuran was added over a half-hour period with nitrogen continually being passed throughout the system. After the mixture was brought to boiling, it was refluxed for 21½ hours. 170 ml. of dry ether acetate was added to decompose excess lithium aluminum hydride. This was then followed by 125 ml. of 15% sodium hydroxide solution followed by 46 ml. of water. After filtering and washing the insoluble material with ether, the filtrate was distilled to remove the solvents. The residue was transferred to a 500 ml. flask and 200 ml. of dry ether was added. Gaseous hydrogen chloride was passed into the ethereal solution until saturated. The hydrochloride which formed was filtered off and suspended in an excess of aqueous sodium hydroxide. This was extracted four times with ether and the total ether extracts were then washed once with water. The ethereal solution was then dried over anhydrous sodium sulfate. The solution was filtered and the filtrate was heated on the steam bath to remove the ether. There was obtained 118.0 g. of a white solid. M.P.=42–43° C. The conversion of perfluorooctanoanilide to 1,1-dihydroperfluorooctyl aniline was 71.3%. The conversion was calculated as follows:

Percent conversion=

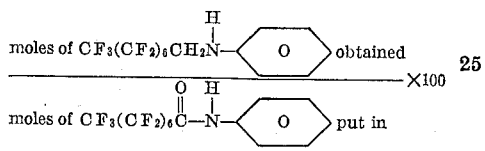

Example 3.—Preparation of bis(1,1-dihydroperfluorooctyl)-carbamyl chloride 22 g. (0.28 mole) of bis-(1,1-dihydroperfluorooctyl) amine was placed in a 300 ml. stainless steel bomb. The bomb was flushed with nitrogen and then evacuated. 100 g. (1.0 mole) of phosgene were introduced while the bomb was cooled in a dry ice-acetone bath. The bomb was then shaken at 125° C. for fifteen hours and at 140° C. for three hours. After allowing the bomb to cool to room temperature (approximately 22° C.), the excess phosgene was then vented. The contents. were dissolved in ether and then washed four times with 0.1 N hydrochloric acid solution, followed by three washings with water. The ether solution was then dried over anhydrous sodium sulfate. The sodium sulfate was filtered off and the ether evaporated off by means of a rotary evaporator. There was obtained 235.7 g. of a dark oil. The conversion of bis-(1,1-dihydroperfluorooctyl) amine to bis-(1,1-dihydroperfluorooctyl) carbamyl chloride was 98.4% of crude product. Redistillation of crude product gave a liquid which was almost water white. B.P.=138–141°/12–13 mm. Hg. The conversion was calculated as follows:

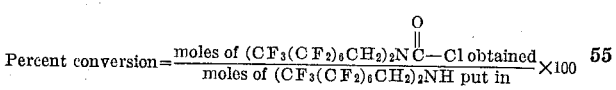

Example 4.—Preparation of tris-(1,1-dihydroperfluorooctyl)phenyl urea

Into a glass liner were placed 30.8 g. (0.037 mole) of bis-(1,1-dihydroperfluorooctyl) carbamyl chloride and 34.2 g. (0.072 mole) of 1,1-dihydroperfluoroocytl aniline. The glass liner was placed in a 300 ml. stainless steel bomb. After the bomb was heated to 150°, it was shaken at this temperature for sixteen hours. The bomb was then allowed to come to room temperature (approximately 22° C.). The contents were triturated with dry ether to remove the contents. After filtering off a small amount of insoluble material, gaseous hydrogen chloride was passed into the ether solution, until saturated, and the 1,1-dihydroperfluorooctyl anilinium chloride that formed was filtered off. The weight of this product was 12 g. The ether solvent of the filtrate was evaporated using a rotary evaporator. Weight of crude residue was 51.7 g. This material was then transferred to 100 ml. distilling flask and distilled. The material boiling between 110–148°/5 mm. Hg was mainly unreacted 1,1-dihydroperfluorooctyl aniline which amounted to 6.5 g. The fraction boiling between 148–180°/5 mm. Hg was mainly unreacted bis-(1,1-dihydroperfluorooctyl) carbamyl chloride which amounted to 2.4 g. The fraction boiling between 180–225°/5 mm. Hg was essentially tris-(1,1-dihydroperfluorooctyl) phenyl urea. The weight of the urea obtained was 33.9 g. The conversion of bis-(1,1-dihydroperfluorooctyl) carbamyl chloride to products was 92.9%. The yield of tris-(1,1-dihydroperfluorooctyl) phenyl urea based on recovered bis-(1,1-dihydroperfluorooctyl) carbamyl chloride was 78.5%. The conversion and yield were calculated as follows:

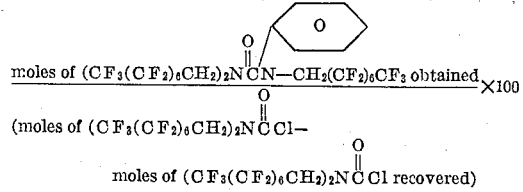

Percent yield=

$$\frac{\text{moles of } (CF_3(CF_2)_6CH_2)_2N\overset{O}{\overset{\|}{C}}N-CH_2(CF_2)_6CF_3 \text{ obtained}}{(\text{moles of } (CF_3(CF_2)_6CH_2)_2N\overset{O}{\overset{\|}{C}}Cl - \text{moles of } (CF_3(CF_2)_6CH_2)_2N\overset{O}{\overset{\|}{C}}Cl \text{ recovered})} \times 100$$

Example 5.—Preparation of tris-(1,1-dihydroperfluorooctyl)phenyl urea

N - (1,1 - dihydroperfluorooctyl) phenylamine 2.3 g. (0.048 mole) and 4.1 g. (0.049 mole) of bis(1,1-dihydroperfluorooctyl) carbamyl chloride were introduced into a thick-walled glass tube. The tube was evacuated, sealed, heated in a furnace at 240° for 16 hours, cooled to 25°, and broken open. The contents were triturated with ether, and a small amount of black material was filtered off. The filtrate was concentrated to a viscous oil, the infrared spectrum of which showed trace amounts of both starting materials. Distillation, using a Hickman molecular still, afforded both starting materials in the first fractions, followed by a pure sample of tris(1,1- dihydroperfluorooctyl)phenyl urea at 150°/0.1 mm. This sample showed no evidence of contamination in infrared and gas chromatographic analysis, but appeared turbid. A clear, viscous oil was obtained after trituration with heptane;

$$\lambda_{max.}^{neat} 5.92\mu$$

Analysis.— Calcd. for $C_{31}H_{11}N_2OF_{45}(1282.4)$: C, 29.05; H, 0.865; N, 2.18. Found: C, 28.6; H, 0.65; N, 2.14.

Example 6.—Bis(1,1-dihydroperfluorooctyl)-1-naphthylphenyl urea

A mixture of 0.613 g. (3.0 mole) phenyl-1-naphthylamine and 2.77 g. (3.2 mole) bis-(1,1-dihydroperfluorooctyl)carbamyl chloride was heated in an evacuated sealed tube at 320° for two hours. The contents of the tube were dissolved in ether (15 ml.) and filtered. Dry hydrogen chloride was passed into the ether. The ether solution was filtered to remove hydrochloride salt and washed twice with water, then dried over sodium sulfate. The ether was removed, giving 2.2 g. of viscous oil.

The oil was dissolved in 15 ml. hexane and placed on a chromatographic column (diameter=30 mm.) containing 90 g. of alumina. The column was eluted with 175 ml. of cyclohexane: benzene (1:1). This eluant contained starting materials. Another 200 ml. of mixed solvent eluted 1.40 g. viscous oil $$(_{IR}^{CO}\lambda = 5.92\mu)$$

The oil was crystallized thrice from cold absolute ethanol, M.P. 89–90°.

*Analysis.*—Calcd. for $C_{33}H_{16}N_2OF_{30}$ (1026): C, 38.7; H, 1.57; N, 2.73. Found: C, 38.9; H, 1.52; N, 2.49.

*Example 7.*—*Bis(1,1-dihydroperfluorooctyl)-bis(2-naphthyl)urea*

A mixture of 1.25 g. of bis(1,1-dihydroperfluorooctyl) carbamyl chloride (1.5 mole) and 0.40 g. of di-2-naphthylamine (1.5 mole) was treated at 355° for one hour in a sealed tube. Trituration of the tube contents with ether gave 0.43 g. of a black insoluble material. The ether solution was concentrated to 1.1 g. of viscous oil. Trituration of the oil with cold benzene gave 0.45 g. insolubles $$(\lambda_{IR}^{CO} = 6.0\mu, \text{ wk.})$$

and 0.55 g. solubles $$(\lambda_{IR}^{CO} \; 5.92\mu)$$

The benzene soluble fraction was dissolved in 10 ml. warm cyclohexane and chromatographed on 15 g. alumin using cyclohexane: benzene (1:1). After eluting with 30 ml. of solvent, the product appeared in the next 60 ml. of eluant, wt. 0.16 g. This was crystallized from cold ethanol; the crystals melted upon warming to room temperature.

*Analysis.*—Calcd. for $C_{37}H_{18}N_2OF_{30}$ (1076): C, 41.2; H, 1.69; N, 2.61. Found: C, 41.3; H, 1.63; N, 2.29.

*Example 8.*—*Preparation of N-(1,1-dihydroperfluorooctyl-N-(1-naphthyl)diphenyl urea*

A mixture of 0.46 g. (2.0 moles) of diphenylcarbamyl chloride and 1.3 g. (2.5 moles) 1,1-dihydroperfluorooctyl-1-naphthylamine was heated at 230° for 17 hours. The tube contents were dissolved in ether and, after filtration, were concentrated to 1.6 g. of a dark oil. The oil, dissolved in 5 ml. of cyclohexane, was placed on 7 g. of alumina. Elution with 100 ml. of cyclohexane gave 1.06 g. of yellow oil (mixture). Subsequent elution with 50 ml. benzene gave 0.61 g. of yellow oil having two peaks on gas chromatography (Silicone 30-W, 3%, 200°) in the ratio of 95:3.

This material was evaporatively distilled and a fraction (90%) collected at 200°/0.1 mm. was crystallized from pentane at —10° C. to yield a chromatographically pure sample, M.P. 71-74° C., $$\lambda_{IR}^{CO} \; 5.98\mu$$

*Example 9.*—*Preparation of tris(1,1-dihydroperfluorooctyl)-1-naphthyl urea*

A mixture of 1.18 g. (2 mole) of 1,1-dihydroperfluorooctyl-1-naphthylamine and 1.90 g. (2 mole) bis(1,1-dihydroperfluorooctyl)carbamyl chloride was heated at 265° C. for 20 hours. Ether trituration gave 2.57 g. of a viscous dark oil. The oil was tube-distilled at 0.1 mm., giving three fractions.

(a) 25–140°, trace oil and crystals
(b) 160°, 0.6 g.
(c) 180°, 1 g. clear oil which was crystallized from heptane, M.P. 45-50°, wt. 0.75 g., $$\lambda_{IR}^{CO} \; 5.9\mu$$

A small sample which had begun to melt at 47°, was taken up to 53° and cooled slowly to 25°. It subsequently melted at 57–60° C.

*Analysis.*—Calcd. for $C_{35}H_{13}N_2OF_{45}$ (1332): C, 31.5; H, 0.98; N, 2.10. Found: C, 31.5; H, 1.34; N, 2.09.

The following demonstrates the thermal stability of one of the compounds of the present invention.

The thermal stability test was carried out on tris-(1,1-dihydroperfluorooctyl)phenyl urea by placing small samples (50–100 mg.) of purified tris(1,1-dihydroperfluorooctyl)phenyl urea in evacuated sealed tubes. The tubes were placed in an aluminum block furnace for specified periods of time at constant temperature ±5°). After the heating period, each sample was evaporatively distilled to the other end of the tube; the recovered tris(1,1-dihydroperfluorooctyl)phenyl urea was weighed and its infrared spectrum taken. The following table illustrates the results.

TABLE I.—THERMAL STABILITY OF TRIS(1,1-DIHYDRO-PERFLUOROOCTYL)PHENYL UREA

| Temperature (° C.) | Time (hrs.) | Percent Recovered | IR Spectrum |
|---|---|---|---|
| 300 | 30 | 100 | Unchanged. |
| 325 | 63 | >96 | Do. |
| 365–375 | 15 | >96 | Do. |
| 390–400 | 30 | 15 | Weak 2.9-3.4 μ abs. |
| 410–415 | 15 | 60 | Do. |

The following demonstrates the utility of a representative compound tris(1,1-dihydroperfluorooctyl)phenyl urea of the invention as a lubricant.

In a test procedure employed, that is, the Ryder gear test, the compound, tris(1,1-dihydroperfluorooctyl)phenyl urea, was compared with a standard lubricant, cellutherm 2505–B a trimethylolpropane ester and a product of Celanese Corporation. In the Ryder gear test, the gears are carefully measured and microscopically examined. The meshing gears are then subjected to increasing load stress while rotating at definite speed in the test liquid at test temperature, usually about 125° F. At the end of a given time, the gears are re-examined and wear is measured by examining each notch. Lubricants are rated according to gear wear as compared with the standard lubricant employed. The results of these tests showed that the compound, tris(1,1-dihydroperfluorooctyl)phenyl urea was 118.6% as good as the standard lubricant tested.

Although certain preferred embodiments of the invention have been disclosed for purposes of illustration, it will be evident that various changes and modifications may be made therein without departing from the scope and spirit of the invention.

We claim:
1. A N,N'-tetra-substituted urea of the formula:

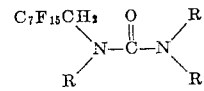

wherein R is a member selected from the group consisting of aryl and 1,1-dihydroperfluorooctyl, at least one R being aryl, said aryl group being a member selected from the group consisting of naphthyl, phenyl and lower alkyl derivatives thereof.

2. 1,1,3-tri-(1,1-dihydroperfluorooctyl)-3-phenylurea.
3. 1,1-di-(1,1 - dihydroperfluorooctyl)-3-(1-naphthyl)-3-phenylurea.
4. 1,1-di-(1,1-dihydroperfluorooctyl) - 3,3-di-(2-naphthyl)urea.
5. 1-(1,1-dihydroperfluorooctyl) - 1-(1-naphthyl)-3,3-diphenylurea.
6. 1,1,3-tri-(1,1dihydroperfluorooctyl) - 3 - (1 - naphthyl)urea.

No references cited.

ALEX MAZEL, *Primary Examiner.*

H. R. JILES, *Assistant Examiner.*